United States Patent
Scheibelhut et al.

(10) Patent No.: US 12,547,649 B2
(45) Date of Patent: Feb. 10, 2026

(54) AUTOMATIC QUALITY ASSESSMENT OF AN ITEM DURING ORDER FULFILLMENT

(71) Applicant: Maplebear Inc., San Francisco, CA (US)

(72) Inventors: Brent Scheibelhut, Toronto (CA); Charles Wesley, San Diego, CA (US); Siby Alappatt, Boston, MA (US); Benjamin Chevoor, Toronto (CA); Viswa Mani Kiran Peddinti, San Francisco, CA (US)

(73) Assignee: Maplebear Inc., San Francisco, CA (US)

(*) Notice: Subject to any disclaimer, the term of this patent is extended or adjusted under 35 U.S.C. 154(b) by 327 days.

(21) Appl. No.: 18/495,581

(22) Filed: Oct. 26, 2023

(65) Prior Publication Data

US 2025/0139137 A1    May 1, 2025

(51) Int. Cl.
*G06F 16/3329*    (2025.01)
*G06F 16/335*    (2019.01)
*G06T 7/00*    (2017.01)

(52) U.S. Cl.
CPC ........ *G06F 16/3329* (2019.01); *G06F 16/335* (2019.01); *G06T 7/0004* (2013.01)

(58) Field of Classification Search
CPC .................................................. G06F 16/3329
See application file for complete search history.

(56) References Cited

U.S. PATENT DOCUMENTS

| | | | |
|---|---|---|---|
| 11,870,935 B1* | 1/2024 | Sekar | H04M 3/5232 |
| 2021/0142391 A1* | 5/2021 | van Horne | G06F 3/04842 |
| 2021/0295409 A1* | 9/2021 | Rudmann | G06Q 30/0631 |
| 2024/0346065 A1* | 10/2024 | van de Nieuwegiessen | G06F 16/45 |

* cited by examiner

Primary Examiner — Di Xiao
(74) Attorney, Agent, or Firm — Fenwick & West LLP

(57) ABSTRACT

Use of a language model to automatically perform visual assessment of quality of an item being fulfilled by a picker. The online system receives an image of the item and identifies a set of potential problems associated with the item. The online system generates a plurality of prompts for input into the language model including the image and one or more questions each corresponding to a respective potential problem of the set potential problems. The online system requests the language model to generate, based on the plurality of prompts, a feedback response for each potential problem. The online system generates an aggregated output by aggregating the feedback response for each potential problem, and based on the aggregated output, a second message that identifies one or more relevant problems associated with the item. The online system causes a device of the picker to display the second message.

20 Claims, 7 Drawing Sheets

AUTOMATIC QUALITY ASSESSMENT OF AN ITEM DURING ORDER FULFILLMENT

BACKGROUND

Picking high-quality groceries is an important part of users trusting online systems, such as online concierge systems, for their grocery delivery. However, the quality of picked products often varies due to the quality of products in stores, the experience of the picker, and common human mistake (e.g., picking wrong item). The problem gets amplified when pickers are picking items for multiple users at once and are in a hurry to complete the picking process. In addition, users of an online concierge system can share their "explicit preferences" (e.g., instructions, generic allergy preferences, etc.) through various forums, while the online concierge system can also learn about their "implicit preferences" (e.g., price sensitivity, organic food preferences, etc.). As the number of the "explicit" and "implicit" preferences increases, it is hard for pickers to manually consider all preferences when picking the right goods.

Therefore, it is highly desirable that the online concierge system help pickers improve the quality of items they pick, in particular, by automatically alerting pickers of potential issues and providing suggestions while they are picking the items. Currently, the online concierge system simply refunds the item to a user when the item doesn't meet their quality requirements, which typically occurs post-delivery and is initiated by the user. While this does not address the root cause of the problem, it gives some assurance to users and pickers that when mistakes do happen, they are covered. Additionally, the online concierge system sends some information to pickers to consider when shopping for an item. The online concierge system then gives ratings to pickers and pay structures to incentivize pickers to comply. However, while the current approach works for a small set of information (e.g., instructions for pickers), it does not scale with additional preferences that pickers need to consider for efficient quality assessment of items that are being picked.

Therefore, the current process of providing suggestions to pickers is not scalable. This leads to a technical problem of how to automatically perform quality assessment of picked items and inform pickers about potential issues with the picked items at a large scale required by the online concierge system.

SUMMARY

Embodiments of the present disclosure are directed to utilizing a language model (e.g., multi-modal language model), or alternatively, a trained computer model, to automatically perform visual assessment of quality of an item picked by a picker in a store as part of an order placed at an online system (e.g., online concierge system).

In accordance with one or more aspects of the disclosure, the online system receives, from a device of a picker associated with the online system, a message indicating that an item from an order is being fulfilled. The online system receives the image of the item. In response to the received message, the online system identifies a set of one or more potential problems associated with the item (or, alternatively, with a category of the item). The online system generates a plurality of prompts for input into a large language model (LLM), the plurality of prompts including the image of the item and one or more questions, each of the one or more questions corresponding to a respective potential problem of the set of one or more potential problems. The online system requests the LLM to generate, based on the plurality of prompts input into the LLM, a feedback response for each potential problem of the set of one or more potential problems. The online system generates the aggregated output by aggregating the feedback response for each potential problem of the set of one or more potential problems. The online system generates, based at least in part on the aggregated output, a second message that identifies one or more relevant problems associated with the item. The online system causes the device of the picker to display the second message in a user interface.

DETAILED DESCRIPTION

Figure 1A:
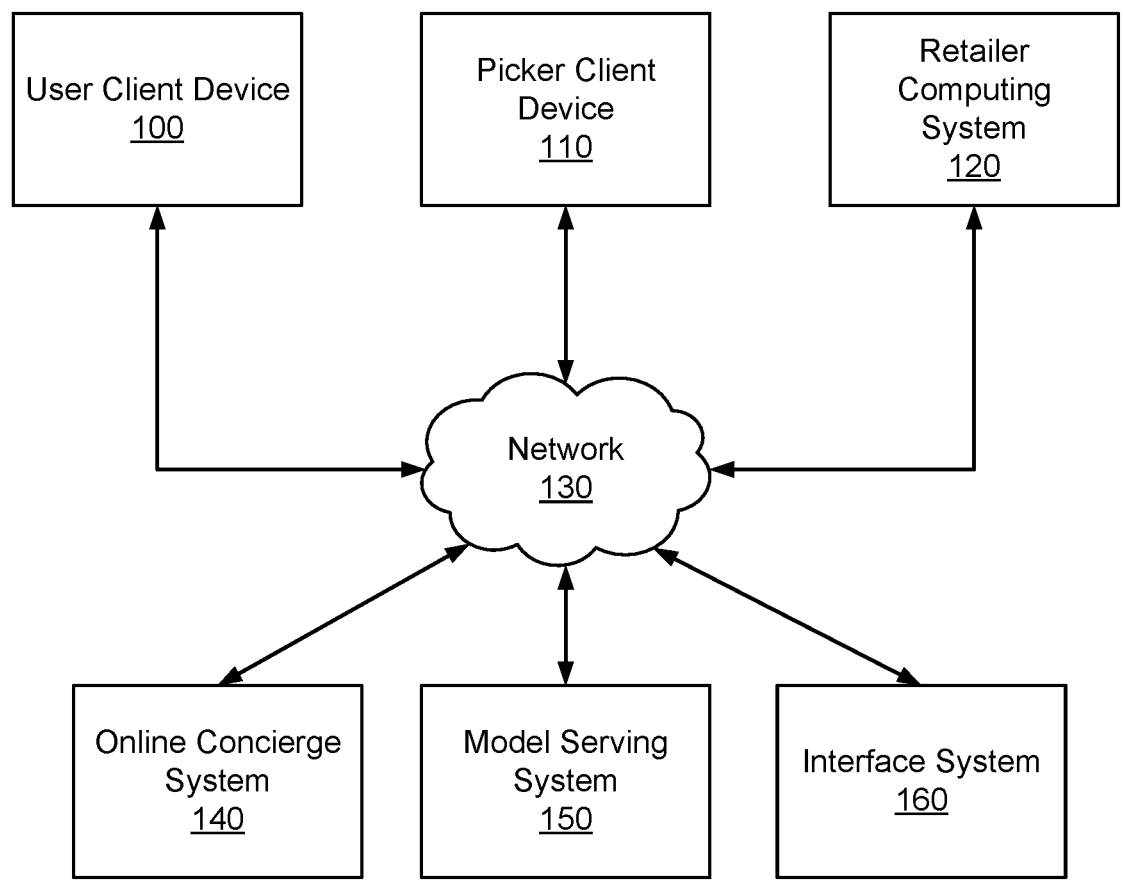
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a user client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1A, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item", as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 dispatches pickers to retail stores to fulfill orders placed by users of the online concierge system 140. To help the pickers pick high-quality items, the online concierge system 140 may use a language model (or, optionally, a trained machine-learning computer model) to determine, for each relevant problem in a set of relevant problems associated with an item being picked, a likelihood of the item having that relevant problem. Specifically, when a picker picks an item, the picker may upload an image of the item to the online concierge system 140. The online concierge system 140 may select a set of possible problems that could be relevant to that type of item and then, for each possible problem, the online concierge system 140 may prompt the language model (or the trained computer model) with the image and a question about whether the item in the image is likely to have that problem. The feedback response from the language model (or from the trained computer model) obtained for each possible problem may be aggregated and provided to the picker, enabling the picker to cure any potential problem before leaving the retail store. Hence, the online concierge system 140 presented herein may operate as a virtual assistant for automatic assessment of item quality powered by the language model and/or the trained computer model to determine potential problems with picked items based on the knowledge of problems possessed by the online concierge system 140 and user preferences. The online concierge system 140 is described in further detail below with regards to FIG. 2.

The model serving system 150 receives requests from the online concierge system 140 to perform tasks using machine-learning models. The tasks include, but are not limited to, natural language processing (NLP) tasks, audio processing tasks, image processing tasks, video processing tasks, and the like. In one or more embodiments, the machine-learning models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learning model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described in one or more embodiments, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The online concierge system 140 may prepare (e.g., via a prompt generation module 260 in FIG. 2) a series of prompts for input into the LLM of the model serving system 150. One prompt in the series of prompts may include an image of an item picked by a picker. Other prompts in the series of prompts may include a set of relevance preferences, where each prompt may include a respective relevance preference of the set of relevance preferences. Hence, the LLM may be configured as a multimodal LLM that is prompted by both images and text. The set of relevance preferences may include: one or more preferences of a user of the online concierge system 140 (e.g., nut-free, organic, price sensitive, etc.), one or more item preferences (e.g., Gala apples, 12 apple count, large size apples, etc.), and/or one or more product/category preferences (e.g., milk-expiration, strawberries-mold, etc.). The set of relevance preferences may be included in the series of prompts in the form of questions. One example series of prompts for input into the LLM is: "Are these 12 counts of Gala apples?", "Are these large sizes?", "Is the expiration date two weeks away?", "Are these organic?".

The online concierge system 140 may receive a series of responses to the series of prompts from the model serving system 150 based on execution of the machine-learning model using the series of prompts. The series of responses may include a response for each relevance preference in the set of relevance preferences based on whether the item in the image satisfies a respective criterion related to each relevance preference of the set of relevance preferences. Thus, the LLM generates a response for each prompt input into the LLM, the response including an answer to a question or request that corresponds to a respective relevance preference of the set of relevance preferences. One example series of responses for the aforementioned series of prompts is: "Yes, they are 12 counts of Gala apples", "No, they are considered small size", "Yes, the expiration date is two weeks away?", "They are not organic". The online concierge system 140 may import the series of responses from the model serving system 150 and aggregate the series of responses into an aggregated output indicating at least one relevant problem associated with the picked item. The online concierge system 140 may use the aggregated output to generate a message for the picker displayed at a user interface of the picker client device 110 prompting the picker to cure the at least one relevant problem associated with the picked item, e.g., in real time before leaving the retailer store.

The LLM of the model serving system 150 may be configured as a multi-modal LLM featuring a human-level understanding of the real world through images. Hence, the multi-modal LLM of the model serving system 150 can be deployed to create a machine-learning assistant for pickers to help pick the right items that meet user requirements based on a variety of inputs (e.g., one or more pictures from the picker, past user preferences, aggregate order information, etc.) that provides real-time feedback to pickers on whether the items meet acceptable quality bars. Note that the online concierge system 140 may algorithmically generate the series of prompts input into the multi-modal LLM, and the series of responses generated by the multi-modal LLM may be algorithmically used by the online concierge system 140 to provide high-quality and informative feedback to the picker as well as to the user with respect to their order.

In one or more embodiments, the task for the model serving system 150 is based on knowledge of the online concierge system 140 that is fed to the machine-learning model of the model serving system 150, rather than relying on general knowledge encoded in the model weights of the model. Thus, one objective may be to perform various types of queries on the external data in order to perform any task that the machine-learning model of the model serving system 150 could perform. For example, the task may be to perform question-answering, text summarization, text generation, and the like based on information contained in an external dataset.

In one or more embodiments, the online concierge system 140 is connected to the interface system 160. The interface system 160 receives external data from the online concierge system 140 and builds a structured index over the external data using, for example, another machine-learning language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learning language model. The interface system 160 can resolve prompt size limitations by generating a structured index of the data and offers data connectors to external data sources. The online concierge system 140 is described in further detail below with regards to FIG. 2.

Figure 1B:
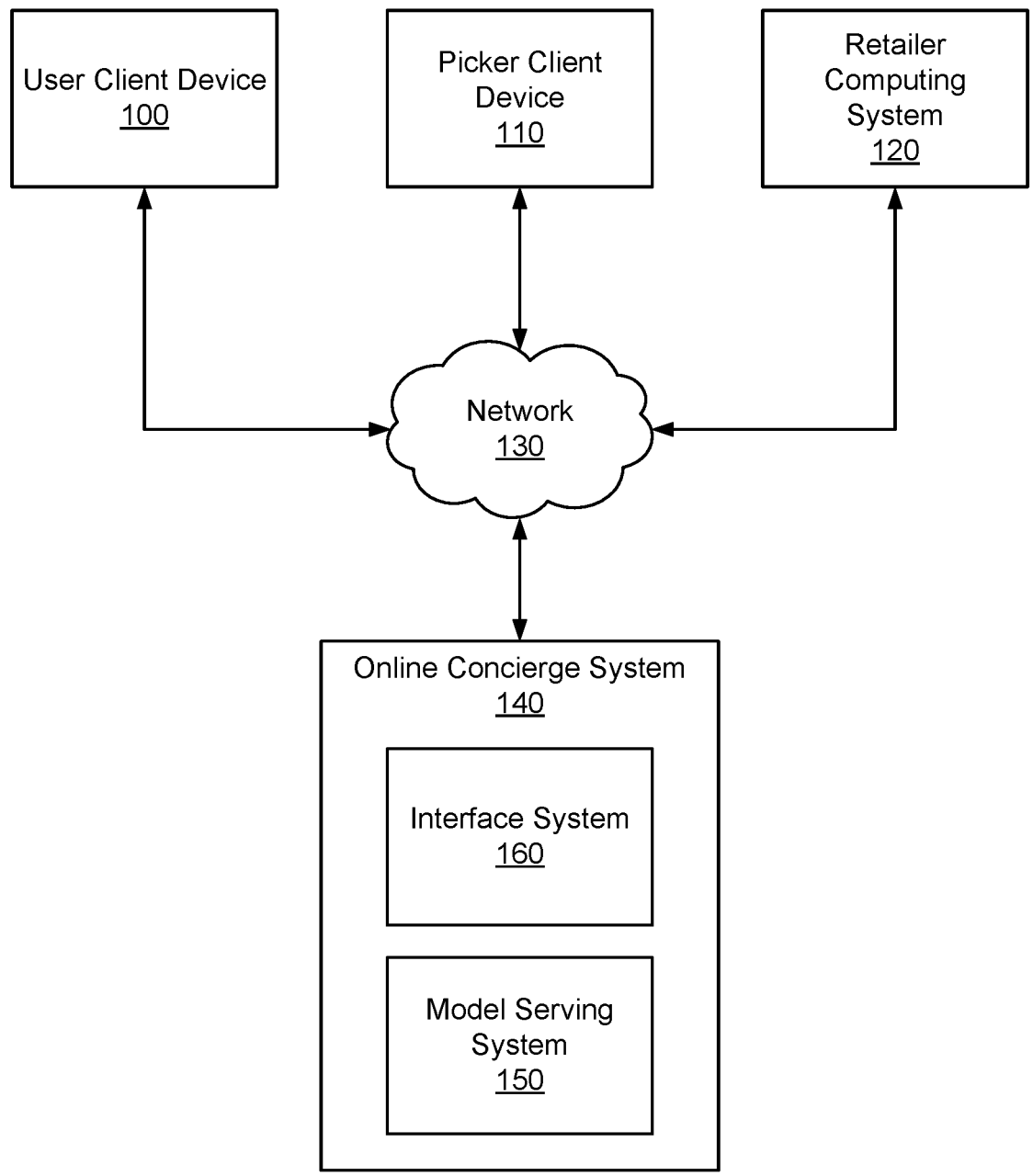
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a user client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Figure 2:
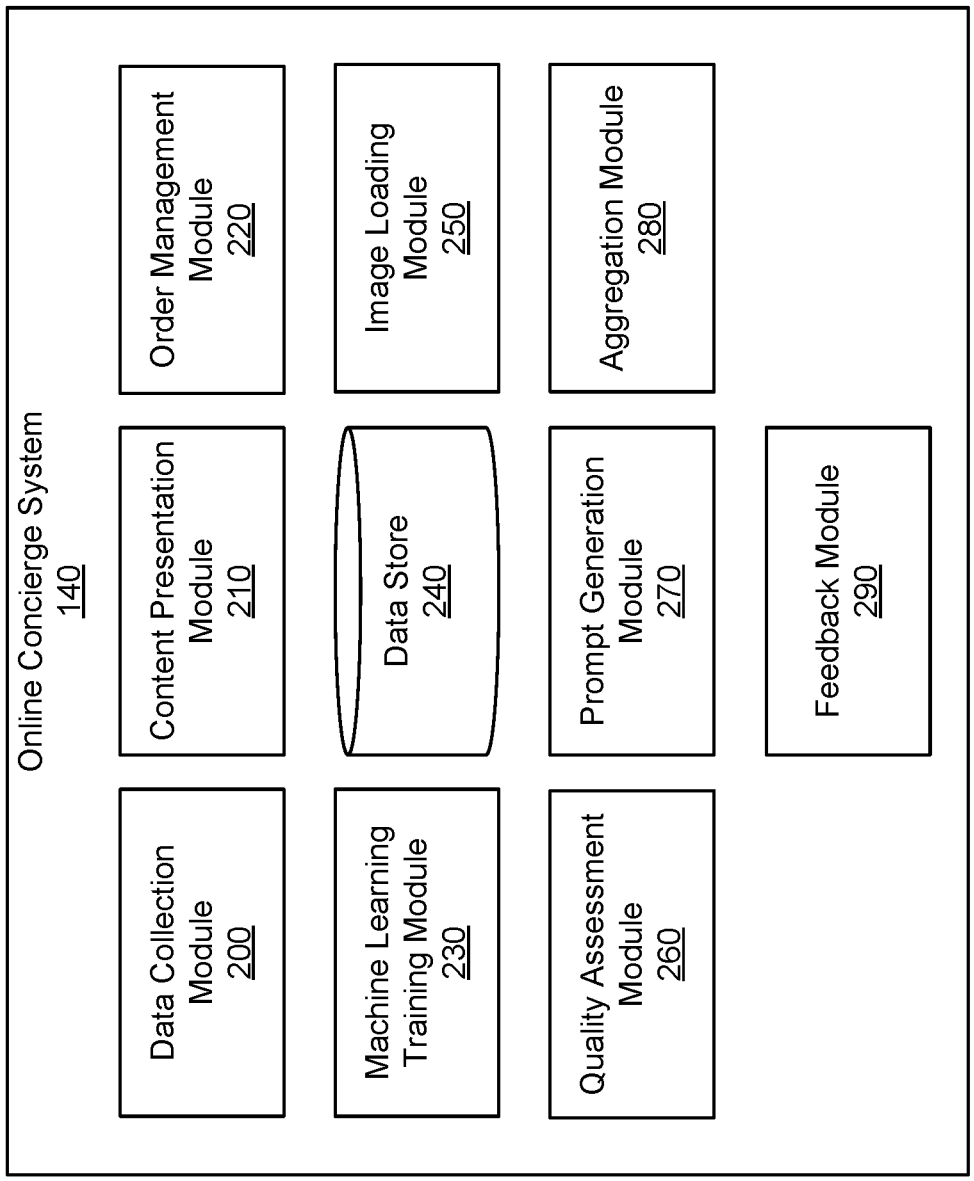
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, an image loading module 250, a quality assessment module 260, a prompt generation module 270, an aggregation module 280, and a feedback module 290. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may further collect the user data that include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may further collect the item data that also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learning models hosted by the model serving system 150, the machine-learning models may already be trained by a separate entity from the entity responsible for the online concierge system 140. In one or more other embodiments, when the model serving system 150 is included in the online concierge system 140, the machine-learning training module 230 may further train parameters of the machine-learning model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

The data store 240 may maintain one or more databases of relevance preferences associated with items in a catalog of items (e.g., available at the data store 240). A relevance preference may correspond to a relevant problem associated with an item in the catalog of items. The data store 240 may maintain a first database of user's relevance preferences, wherein the user's relevance preferences may be inferred user's relevance preferences and/or explicit user's relevance preferences. The data store 240 may further maintain a second database of item relevance preferences gained from, e.g., previous experiences from the general population. And the data store 240 may also maintain a third database of product/category relevance preferences gained from, e.g., previous experiences from the general population, wherein the product/category relevance preferences may be inferred product/category relevance preferences and/or explicit product/category relevance preferences.

The image loading module 250 may load to the online concierge system 140 an image of an item picked by a picker associated with the online concierge system 140. When a picker is picking a specific item, the picker may scan a barcode of the item (e.g., non-produce item), which may trigger loading of one or more images of the item from an image database of the online concierge system 140 (e.g., as available at the data store 240). Alternatively or additionally, the picker may take a picture of an item being picked (e.g., produce item captured via a camera of the picker client device 110) and submit the taken picture (i.e., image of the item) to the online concierge system 140 via the picker client device 110.

The quality assessment module 260 performs quality assessment of an item being picked by a picker associated with the online concierge system 140. The quality assessment module 260 may apply a computer model (e.g., machine-learning model) trained to determine, for each of a set of relevant problems (i.e., set of relevance preferences) associated with the picked item, a likelihood of the picked item having that particular problem. The computer model deployed by the quality assessment module 260 may run a machine-learning algorithm to determine the likelihood of the picked item having the particular problem of the set of relevant problems, based on a query to the computer model including an image of the item and the set of relevance preferences.

The quality assessment module 260 may receive the image of the picked item from the image loading module 250 and include the received image into the query to the computer model. In addition to the image of the picked item, the quality assessment module 260 may include in the query to the computer model the set of relevance preferences comprising one or more preferences of a user of the online concierge system 140, one or more item preferences, and one or more product/category preferences. The quality assessment module 260 may further include in the query to the computer model at least one of: information about one or more prior orders placed by the user, information about one or more prior refunds associated with the picked item, information about one or more prior orders that include the picked item, information about one or more past item replacements, or information about past performance of the picker. A set of parameters for the computer model deployed by the quality assessment module 260 may be stored on one or more non-transitory computer-readable media of the quality assessment module 260. Alternatively, the set of parameters for the computer model deployed by the quality assessment module 260 may be stored on one or more non-transitory computer-readable media of the data store 240. The quality assessment module 260 may provide determined likelihoods of the picked item having the set of relevant problems to the aggregation module 280.

In one or more embodiments, the trained computer model is implemented as a multimodal language model (e.g., multimodal LLM) prompted with the image of the picked item and the set of relevance preferences. Alternatively, the quality assessment module 260 may not apply any computer model trained for visual quality assessment. Instead, the LLM of the model serving system 150 may be utilized for visual quality assessment of picked items. In such cases, the prompt generation module 270 may generate a series of prompts for input into the LLM (e.g., from a template) by including in the prompts (e.g., multimodal prompt) the image of the picked item and the set of relevance preferences. The set of relevance preferences may be included in the series of prompts in the form of questions or requests on whether the item in the image satisfies a criterion related to a respective relevance preference of the set of relevance preferences. In one or more embodiments, the prompt generation module 270 may determine, upon receiving a message from the picker client device 110 that an item from an order is being fulfilled (i.e., picked), a set of one or more potential problems associated with a category of the item. The prompt generation module 270 may then generate the series of prompts for input into the LLM that include an image of the item (e.g., as obtained from the image loading module 250) and one or more questions, where each question corresponds to a respective potential problem of the determined set of one or more potential problems.

The prompt generation module 270 may include, in one prompt of the series of prompts, the image of the item being fulfilled (e.g., picked in the store). The image of the item may be taken by the picker (via a camera of the picker client device 110) and loaded to the prompt generation module 270 via the image loading module 250. The prompt generation module 270 may then include the loaded image into one prompt of the series of prompts input into the LLM. Alternatively, information about a scanned barcode of the picked item may trigger loading of one or more images of the picked item from an image catalog of the online concierge system 140 (e.g., as stored at the data store 240). The one or more images loaded from the image catalog may be passed onto the prompt generation module 270 that includes the one or more images into one or more prompts of the series of prompts input into the LLM.

The prompt generation module 270 may further include, in the series of prompts, and as part of the set of relevance preferences, one or more preferences of the user, one or more item preferences, and one or more product/category preferences. Additionally, the prompt generation module 270 may generate the series of prompts using supplemental information (e.g., as available at the data store 240) including but not limited to: information about prior orders from the user; information about prior refunds for specific items (e.g., refund rationale, an image provided by the user of the refunded item, etc.); information about orders that may not belong to the current user but also had issues with specific items at higher rates (e.g., weighted based on the specific user history with the items in their order, weight less than the generalized item success rate data if the user specific data are available, etc.); information about aggregate issues at the item-level (e.g., specific store locations) or product-level (e.g., across locations and retailers) where the item-level issues may be weighted more highly; information about past bad replacements (e.g., zero sugar peach tea replaced with regular peach tea) as gained from feedback from the current user and order data from other users with similar replacements; and/or information about past picker performance (e.g., if the picker has elevated order issues with items under the "produce" taxonomy node, applying more scrutiny for this particular picker for those items).

The prompt generation module 270 may request the LLM to generate, based on the series of prompts input into the LLM, a feedback response for each potential problem of the set of one or more potential problems (i.e., for each relevance preference of the set of relevance preferences included in the series of prompts). The feedback response for each potential problem (or relevance preference) may include an indication on whether the item in the image satisfies a respective criterion related to each potential problem (or relevance preference). The feedback response for each relevance preference generated by the LLM may be imported to the online concierge system 140 via, e.g., the aggregation module 280.

The aggregation module 280 may generate an aggregated response (i.e., aggregated output of the computer model deployed by the quality assessment module 260) by aggregating the likelihoods of the item having the potential problems as determined by the trained computer model. Alternatively, the aggregation module 280 may generate an aggregated response by aggregating the feedback response for each potential problem (or relevance preference) as generated by the LLM. As the feedback response for each potential problem indicates whether the item in the image passes or fails each potential problem (or issue), the aggregation module 280 may determine, by generating the aggregated response, a subset of potential issues (or problems) for the picked item.

If at least one of the tests fail (i.e., if the item fails at least one of the tested relevant issues), the aggregation module 280 may generate a message for the picker informing the picker that there is a potential problem with the picked item. The content presentation module 210 may cause the picker client device 110 to display a user interface with the message, e.g., in real time while the picker is still in the store and able to fix the problem. The aggregation module 280 may aggregate the feedback responses (or the likelihoods as determined by the computer model) in a manner that can be provided as prompting feedback to the picker. For example, the message generated by the aggregation module 280 and displayed to the picker may be, e.g., "Find larger apple size and organic." If, for some reason, the picker cannot fix the problem related to the picked item, the content presentation module 210 may communicate this information to the user (e.g., as a second message displayed via a user interface of the user client device 100) including the reason why the item could not be picked (and was refunded).

The feedback module 290 may receive feedback from the user (e.g., from the user client device 100) in relation to the second message provided to the user. The feedback from the user may include confirmation of the picker's decision to return the previously picked item for not satisfying a specific quality bar. Alternatively or additionally, the feedback from the user may include one or more messages from the user related to complaining about one or more other items in the placed order. The feedback module 290 may classify the received feedback from the user into a corresponding relevance preference (i.e., corresponding issue type) of the set of relevance preferences. The feedback module 290 may then update the set of relevance preferences (e.g., as maintained at the data store 240) by updating the corresponding relevance preference using the received feedback from the user. The updated set of relevance preferences may be then utilized for subsequent passes of the trained computer model deployed by the quality assessment module 260. Alternatively, the updated set of relevance preferences may be utilized for subsequent passes of the LLM prompted by the prompt generation module 270.

Once the picker has finished fulfillment of the item, the feedback module 290 may generate a summary message that is displayed at the user interface of the user client device 100 (e.g., via the content presentation module 210) to assure the user that the item is picked with the correct preference. For example, the feedback module 290 may generate a summary message, such as, "The shopper found large size 12 gala apples that are organic and fresh," even though the user has not explicitly specified wanting fresh apples, but it was inferred from the user's preferences (e.g., input into the LLM or the computer model) that the user prefers fresh apples. Furthermore, the feedback module 290 may generate a summary message that includes reasons why an item was refunded, or a preference was not followed. For example, if none of the apples are "big", the feedback module 290 may generate the summary message displayed at the user interface of the user client device 100, such as, "There are no big apples in store."

If the user for any reason did not like a picked item and provides corresponding feedback, the feedback module 290 may aggregate the received feedback per user, per product and/or per category. The feedback module 290 may pass the aggregated feedback to the LLM (or the trained computer model) to be utilized for the next order so that the LLM (or the trained computer model) may determine what are the common issues (or problems) to look out for. For example, the LLM (or the trained computer model) may determine that "the most common issue" to look out for milk is expiration date, "the most common issue" to look out for strawberries is mold, etc. The determined information about "the most common issues" may be provided to the quality assessment module 260 and/or the prompt generation module 270 so that the information about "the most common issues" may be provided as additional inputs to the computer model and/or included into the series of prompts input into the LLM.

Figure 3:
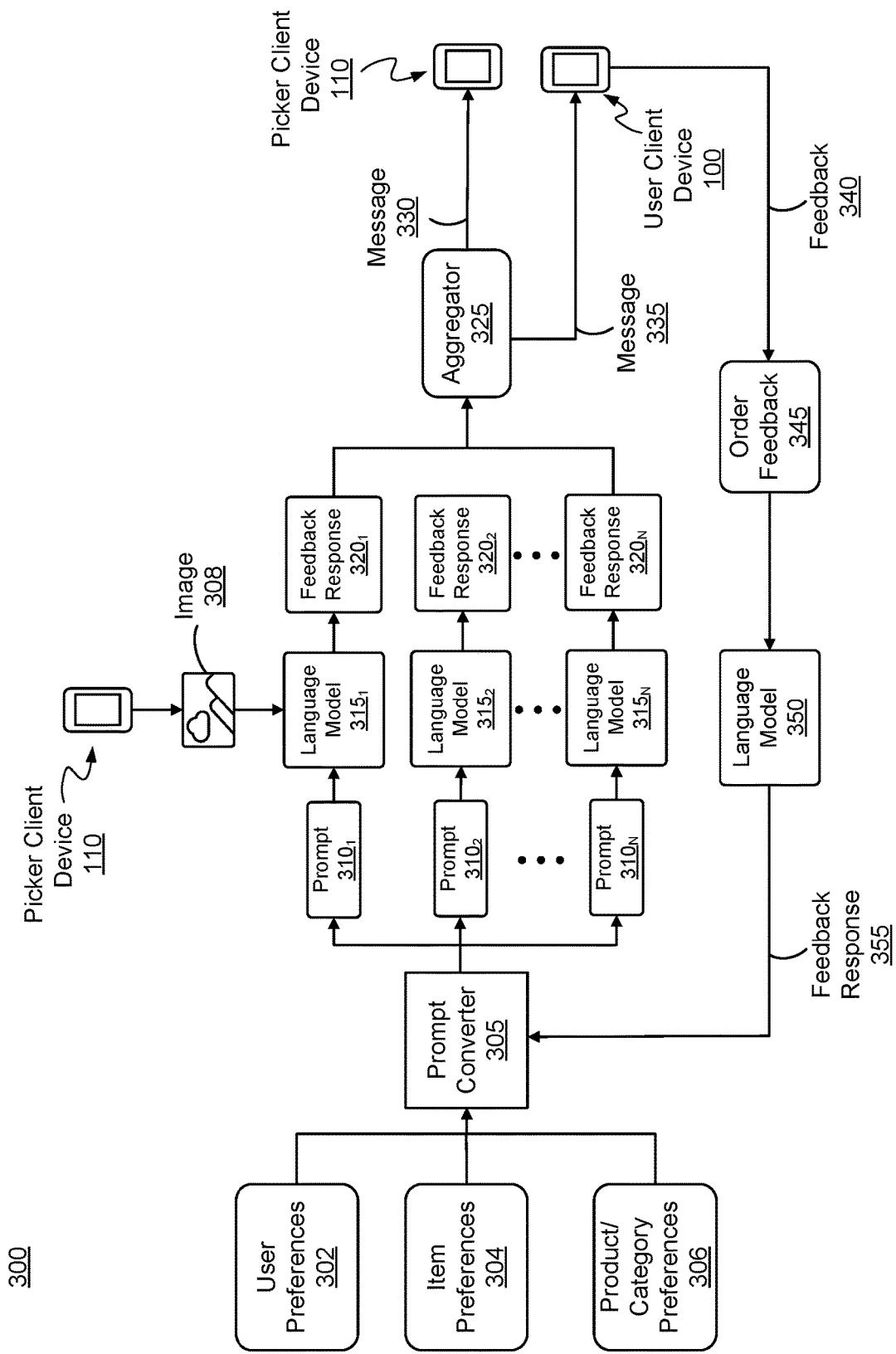
FIG. 3 illustrates an example system workflow for performing automatic visual assessment of quality of an item picked by a picker as part of an order placed at an online concierge system, in accordance with one or more embodiments.

FIG. 3 illustrates an example system workflow 300 for performing automatic visual assessment of quality of an item picked by a picker as part of an order placed at the online concierge system 140, in accordance with one or more embodiments. A prompt converter 305 (e.g., as part of the prompt generation module 270) may receive user preferences 302 (e.g., nut-free, organic, price sensitive, etc.), item preferences 304 (e.g., Gala apples, 12 count of apples, large apple size, etc.), and product/category preferences 306 (e.g., milk-expiration, strawberries-mold, etc.). The prompt converter 305 may generate a series of prompts $310_1$, $310_2$, ..., $310_N$ (e.g., N≥3) for each of relevance preferences in the user preferences 302, the item preferences 304, and the product/category preferences 306. At the same time, an image 308 of a picked item may be loaded from the picker client device 110. The image 308 and the series of prompts $310_1$, $310_2$, ..., $310_N$ may be provided to language models $315_1$, $315_2$, ..., $315_N$. In one or more embodiments, the language models $315_1$, $315_2$, ..., $315_N$ may be part of a same LLM (e.g., of the model serving system 150). Alternatively, the language models $315_1$, $315_2$, ..., $315_N$ may be replaced with one or more trained computer models (e.g., one or more trained machine-learning models), such as the trained computer model deployed by the quality assessment module 260.

The language models $315_1$, $315_2$, ..., $315_N$ may generate a series of feedback responses $320_1$, $320_2$, ..., $320_N$, where each feedback response $320_1$, $320_2$, ..., $320_N$ is generated in response to a corresponding prompt $310_1$, $310_2$, ..., $310_N$. Each feedback response $320_1$, $320_2$, ..., $320_N$ may include information (e.g., likelihood) on whether the item in the image 308 satisfies a respective criterion related to each relevance preference in the user preferences 302, the item preferences 304, and the product/category preferences 306. An aggregator 325 (e.g., as part of the aggregation module 280) may aggregate the feedback responses $320_1$, $320_2$, ..., $320_N$ into an aggregated response with an indication that at least one criterion related to a corresponding relevance preference is not satisfied.

The aggregator 325 may use the aggregated response to generate a message 330 for the picker client device 110. The message 330 may be displayed at a user interface of the picker client device 110 prompting the picker to cure a problem associated with the item in real time (e.g., before leaving the retailer store). Additionally, the aggregator 325 may use the aggregated response to generate a message 335 for the user client device 100. The message 335 may be displayed at a user interface of the user client device 100 informing the user about the problem associated with the item and, optionally, a reason for a refund associated with the item. In one or more embodiments, instead of the aggregator 325, a language model (e.g., LLM, not shown in FIG. 3) is utilized to generate the messages 330 and 335 based on the feedback responses $320_1$, $320_2$, ..., $320_N$.

In response to viewing the message 335, the user may provide feedback 340 via the user interface of the user client device 100. The feedback 340 may be collected as part of an order feedback 345 (e.g., via the feedback module 290). The order feedback 345 may be provided as an input to a language model 350 (or trained computer model) that generates a feedback response 355 with a classification of the order feedback 345 into one or more relevance preferences. The prompt converter 305 may use the feedback response 355 to update the one or more relevance preferences, i.e., one or more of the user preferences 302, the item preferences 304, and the product/category preferences 306 for the next run of the language models $315_1, 315_2, \ldots, 315_N$ (e.g., for the next order placed by the same user or different user).

Figure 4A:
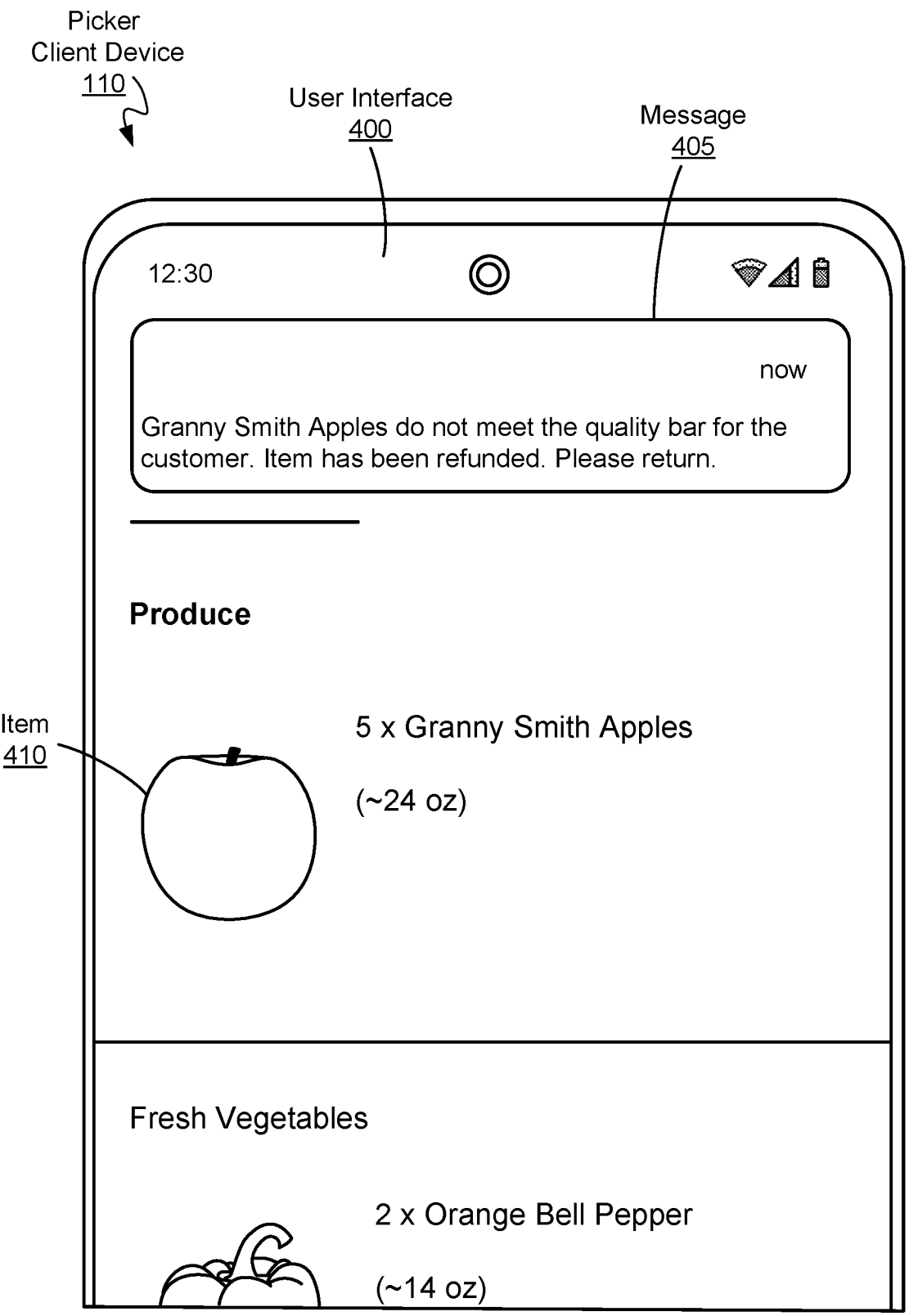
FIG. 4A illustrates an example user interface displayed at a picker client device with a communication message for a picker associated with an online concierge system, in accordance with one or more embodiments.

FIG. 4A illustrates an example user interface 400 displayed at the picker client device 110 with a message 405 for a picker, in accordance with one or more embodiments. The content presentation module 210 may cause the picker client device 110 to display the user interface 400 with the message 405 (e.g., generated by the aggregation module 280) that informs the picker that an item 410 picked by the picker does not meet a quality bar for a user of the online concierge system 140, and prompts the picker to return the picked item 410. Alternatively, a variation of the message 405 may be displayed at the user interface 400 of the picker client device 110, such as, "This item has been refunded because it does not meet item quality requirements."

In one or more other embodiments (not shown in FIG. 4A), a message displayed at the user interface 400 (e.g., as generated by the aggregation module 280) may be overlayed on top of an image the picker is taking of the item 410. The message displayed at the user interface 400 as an overlay may be, e.g., "The apples are not big enough" or "These are not granny smith apples", etc. In one or more other embodiments (not shown in FIG. 4A), a message displayed at the user interface 400 (e.g., as generated by the aggregation module 280) may offer guidance to the picker, such as, "These bananas do not meet user's requirements for ripeness; please go select other bananas."

Figure 4B:
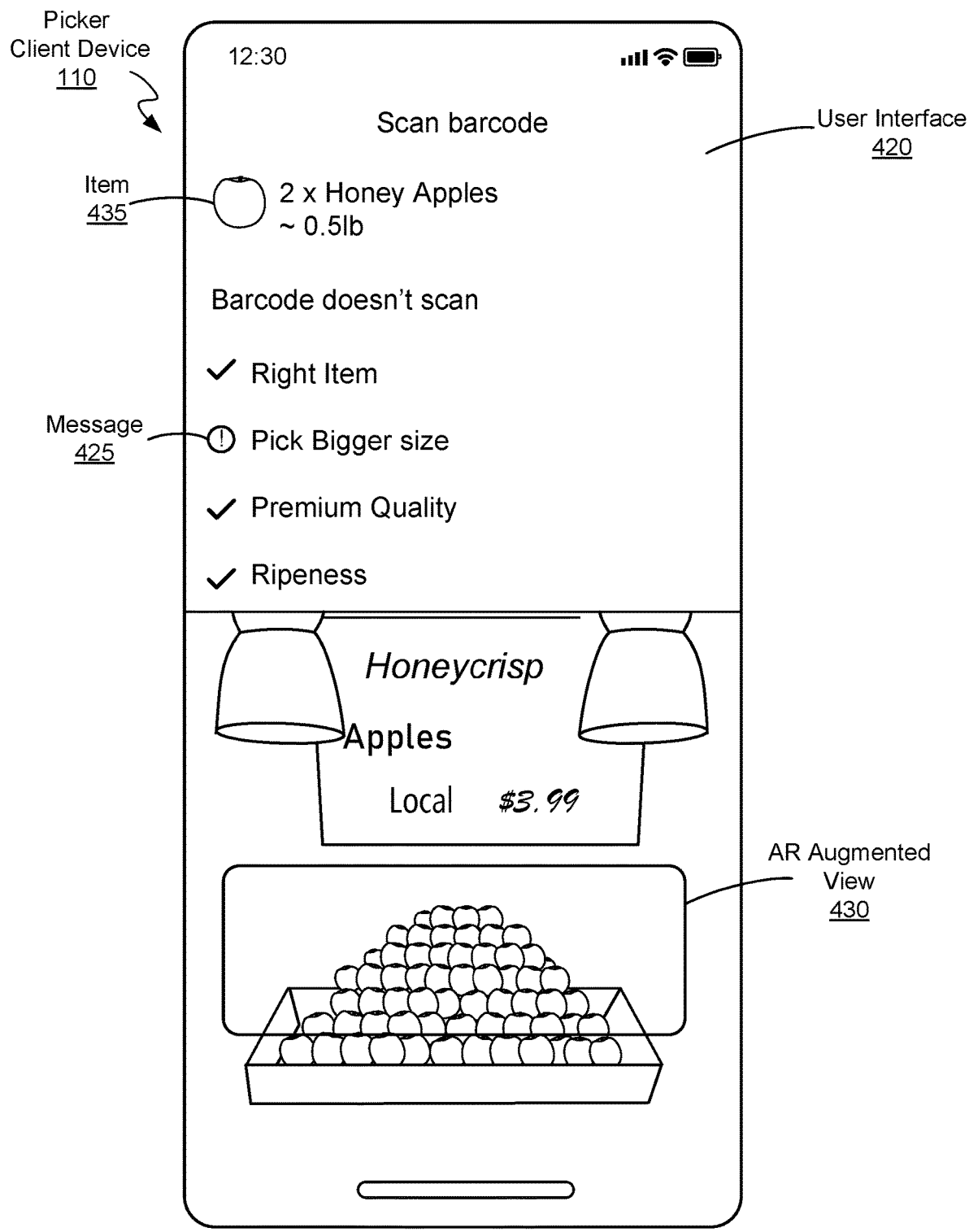
FIG. 4B illustrates an example user interface displayed at a picker client device with a communication message for a picker associated with an online concierge system overlayed with an artificial reality (AR) augmented view of items in a store, in accordance with one or more embodiments.

FIG. 4B illustrates an example user interface 420 displayed at the picker client device 110 with a message 425 for a picker overlayed with an artificial reality (AR) augmented view 430 of an item 435 in a store (e.g., from the picker's point of view), in accordance with one or more embodiments. The message 425 displayed at the user interface 420 (e.g., as generated by the aggregation module 280) may prompt the picker to pick the bigger size item so that the picker can cure a problem associated with the item 435 in real time, e.g., before leaving the store. In one or more other embodiments (not shown in FIG. 4B), the message 425 providing guidance to the picker may be displayed in an AR interface (e.g., AR goggles worn by the picker).

Figure 5:
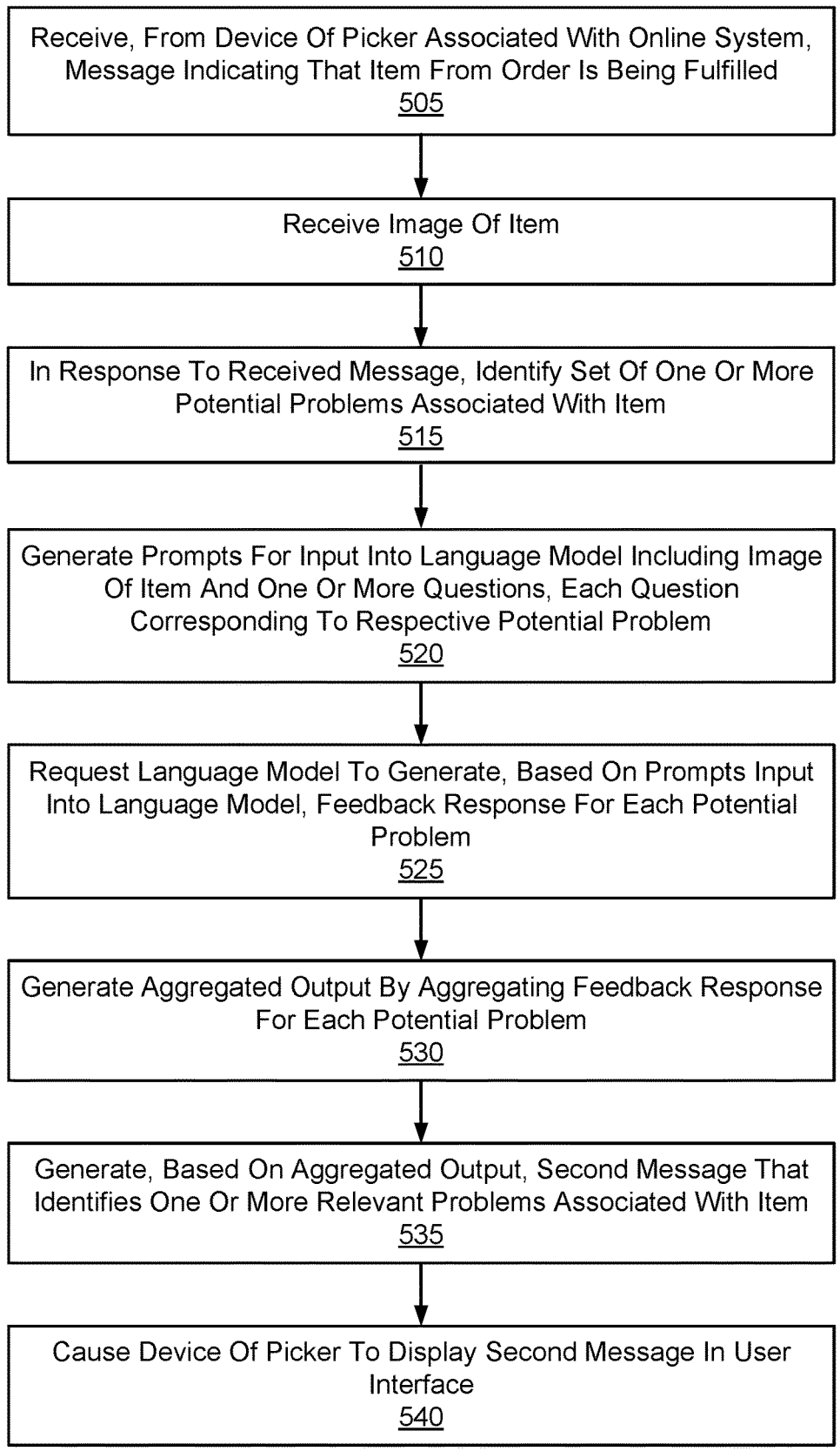
FIG. 5 is a flowchart for a method of using a language model to automatically perform visual assessment of quality of an item picked by a picker associated with an online concierge system during fulfillment of an order placed at the online concierge system, in accordance with one or more embodiments.

FIG. 5 is a flowchart for a method of using a language model (or trained computer model) to automatically perform visual assessment of quality of an item picked by a picker associated with an online concierge system during fulfillment of an order placed at the online concierge system, in accordance with one or more embodiments. Alternative embodiments may include more, fewer, or different steps from those illustrated in FIG. 5, and the steps may be performed in a different order from that illustrated in FIG. 5. These steps may be performed by an online concierge system (e.g., the online concierge system 140). Additionally, each of these steps may be performed automatically by the online concierge system without human intervention.

The online concierge system 140 receives 505, from a device of a picker associated with the online concierge system 140 (e.g., from the picker client device 110), a message indicating that an item from an order is being fulfilled. The online concierge system 140 receives 510 (e.g., via the image loading module 250) an image of the item. The online concierge system 140 may load (e.g., via the image loading module 250), based on a barcode of the item identified by the device of the picker, the image of the item from a database of the online concierge system 140 (e.g., as available in a catalog of items stored at the data store 240). Alternatively, the online concierge system 140 may receive (e.g., via the image loading module 250) the image of the item that was submitted to the online concierge system 140 via the device of the picker.

In response to the received message, the online concierge system 140 identifies 515 (e.g., via the prompt generation module 270) a set of one or more potential problems associated with the item (or, alternatively, with a category of the item). The online concierge system 140 may identify the set of one or more potential problems by selecting (e.g., via the prompt generation module 270), from predetermined sets of potential problems associated with different categories of items (e.g., as available in catalog of items stored at the data store 240), and based on one or more preferences of a user of the online concierge system 140, the set of one or more potential problems associated with the item.

The online concierge system 140 generates 520 (e.g., via the prompt generation module 270) a plurality of prompts for input into the language model (e.g., LLM of the model serving system 150), the plurality of prompts including the image of the item and one or more questions, each of the one or more questions corresponding to a respective potential problem of the set of one or more potential problems. The online concierge system 140 may generate (e.g., via the prompt generation module 270) the plurality of prompts by including in the plurality of prompts a set of relevance preferences, the set of relevance preferences comprising one or more preferences of a user of the concierge system 140, one or more item preferences, and one or more preferences for product categories. The online concierge system 140 may generate (e.g., via the prompt generation module 270) the plurality of prompts by further including in the plurality of prompts at least one of: information about one or more prior orders placed by the user, information about one or more prior refunds associated with the item, information about one or more prior orders that include the item, information about one or more past item replacements, or information about past performance of the picker.

The online concierge system 140 requests 525 (e.g., via the prompt generation module 270) the language model to generate, based on the plurality of prompts input into the language model, a feedback response for each potential problem of the set of one or more potential problems. The online concierge system 140 may request (e.g., via the prompt generation module 270) the language model to generate, based on whether the item in the image satisfies a respective criterion related to each relevance preference in the set of relevance preferences, the feedback response for each relevance preference in the set of relevance preferences.

The online concierge system 140 generates 530 (e.g., via the aggregation module 280) an aggregated output by aggregating the feedback response for each potential problem of the set of one or more potential problems. The online concierge system 140 generates 535 (e.g., via the aggregation module 280), based at least in part on the aggregated output, a second message that identifies one or more relevant problems associated with the item. The online concierge system 140 may generate (e.g., via the aggregation module 280) the second message such that the second message prompts the picker to cure the one or more relevant problems associated with the item before the picker leaves a store associated with the item.

The online concierge system 140 causes 540 (e.g., via the content presentation module 210) the device of the picker to display the second message in a user interface. The online concierge system 140 may further cause (e.g., via the content presentation module 210) a device of the user (e.g., the user client device 100) to display a user interface with a third message informing the user about the one or more relevant problems associated with the item and a reason for a refund associated with the item. The online concierge system 140 may receive (e.g., via the feedback module 290), from the device of the user, feedback about the third message. The online concierge system 140 may classify (e.g., via the feedback module 290) the received feedback into a corresponding relevance preference of a set of relevance preferences. The online concierge system 140 may update (e.g., via the feedback module 290) the set of relevance preferences by updating the corresponding relevance preference with the received feedback. The online concierge system 140 may update, based on the updated set of relevance preferences, the plurality of prompts for input into the language model.

In one or more embodiments, the online concierge system 140 receives, from the device of the picker, another message indicating that a second item from the order is being fulfilled. Furthermore, the online concierge system 140 receives (e.g., via the image loading module 250) an image of the second item. In response to the received other message, the online concierge system 140 may identify (e.g., via the prompt generation module 270) a second set of one or more potential problems associated with the second item (or, alternatively, with a category of the second item). The online concierge system 140 may access (e.g., via the quality assessment module 260) a computer model trained to determine, for each of the second set of one or more potential problems, and based on the image of the second item, a likelihood of the second item having each of the second set of one or more potential problems. The online concierge system 140 may apply the trained computer model (e.g., via the quality assessment module 260) to the image of the second item, wherein the applying causes the trained computer model to output a likelihood that the second item has each of one or more problems. The online concierge system 140 may generate (e.g., via the aggregation module 280) a second aggregated output by aggregating one or more likelihoods that the second item has the one or more problems. The online concierge system 140 may generate (e.g., via the aggregation module 280), based at least in part on the second aggregated output, a message that identifies the one or more problems associated with the second item. The online concierge system 140 may cause the device of the picker to display in the user interface the message identifying the one or more problems associated with the second item.

Embodiments of the present disclosure are directed to the online concierge system 140 that utilizes a language model (or, alternatively, a trained computer model) to automatically perform visual assessment of quality of an item picked by a picker in a store during fulfillment of an order placed at the online concierge system 140. The online concierge system 140 uses the language model (or trained computer model) to determine, for each potential problem of a set of potential problems associated with a picked item, whether the item has that potential problem, based on inputs to the language model (or the trained computer model). The inputs to the language model (or to the trained computer model) may include an image of the item being picked and supplemental information (e.g., user preferences and previous examples of good/bad items relevant to that type of problem). The language model may be a multimodal LLM that is prompted by both images and text. If one or more relevant problem in relation to the picked item are identified by the LLM (or the trained computer model), the online concierge system 140 notifies the picker of the one or more identified problems, e.g., while the picker is still in the store, so the picker can fix the identified problem(s). Hence, the online concierge system 140 presented herein includes an automatic quality assessment assistant that helps pickers with various choices in order to pick the right items for users of the online concierge system 140 while reducing their cognitive load, which ensures picker satisfaction as well as user satisfaction.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
    receiving, from a device of a picker associated with an online system, a message indicating that an item from an order is being fulfilled;
    receiving an image of the item;
    in response to the received message, identifying a set of one or more potential problems associated with the item;
    generating a plurality of prompts for input into a large language model (LLM), the plurality of prompts including the image of the item and one or more questions, each of the one or more questions corresponding to a respective potential problem of the set of one or more potential problems;
    requesting the LLM to generate, based on the plurality of prompts input into the LLM, a feedback response for each potential problem of the set of one or more potential problems;
    generating an aggregated output by aggregating the feedback response for each potential problem of the set of one or more potential problems;
    generating, based at least in part on the aggregated output, a second message that identifies one or more relevant problems associated with the item; and
    causing the device of the picker to display the second message in a user interface.

2. The method of claim 1, wherein identifying the set of one or more potential problems comprises:
    selecting, from predetermined sets of potential problems associated with different categories of items, and based on one or more preferences of a user of the online system, the set of one or more potential problems associated with the item.

3. The method of claim 1, wherein receiving the image of the item comprises:
    loading, based on a barcode of the item identified by the device of the picker, the image of the item from a database of the online system.

4. The method of claim 1, wherein receiving the image of the item comprises:
    receiving the image of the item that was submitted to the online system via the device of the picker.

5. The method of claim 1, wherein generating the plurality of prompts for input into the LLM comprises:
    generating the plurality of prompts by including in the plurality of prompts a set of relevance preferences, the set of relevance preferences comprising one or more preferences of a user of the online system, one or more item preferences, and one or more preferences for product categories.

6. The method of claim 5, wherein generating the plurality of prompts for input into the LLM further comprises:
    generating the plurality of prompts by including in the plurality of prompts at least one of: information about one or more prior orders placed by the user, information about one or more prior refunds associated with the item, information about one or more prior orders that include the item, information about one or more past item replacements, or information about past performance of the picker.

7. The method of claim 5, wherein requesting the LLM comprises:
    requesting the LLM to generate, based on whether the item in the image satisfies a respective criterion related to each relevance preference in the set of relevance preferences, the feedback response for each relevance preference in the set of relevance preferences.

8. The method of claim 1, further comprising:
    receiving, from the device of the picker, a third message indicating that a second item from the order is being fulfilled;
    receiving an image of the second item;
    in response to the received third message, identifying a second set of one or more potential problems associated with the second item;
    accessing a computer model of the online system trained to determine, for each of the second set of one or more potential problems, and based on the image of the second item, a likelihood of the second item having each of the second set of one or more potential problems;
    applying the trained computer model to the image of the second item, wherein the applying causes the trained computer model to output a likelihood that the second item has each of one or more problems;
    generating a second aggregated output by aggregating one or more likelihoods that the second item has the one or more problems;
    generating, based at least in part on the second aggregated output, a third message that identifies the one or more problems associated with the second item; and
    causing the device of the picker to display the third message in the user interface.

9. The method of claim 1, wherein generating the second message further comprises:
    generating the second message such that the second message prompts the picker to cure the one or more relevant problems associated with the item before the picker leaves a store associated with the item.

10. The method of claim 1, further comprising:
    causing a device of a user of the online system to display a user interface with a third message informing the user about the one or more relevant problems associated with the item and a reason for a refund associated with the item.

11. The method of claim 10, further comprising:
receiving, from the device of the user, feedback about the third message;
classifying the received feedback into a corresponding relevance preference of a set of relevance preferences;
updating the set of relevance preferences by updating the corresponding relevance preference with the received feedback; and
updating, based on the updated set of relevance preferences, the plurality of prompts for input into the LLM.

12. A computer program product comprising a non-transitory computer readable storage medium having instructions encoded thereon that, when executed by a processor, cause the processor to perform steps comprising:
receiving, from a device of a picker associated with an online system, a message indicating that an item from an order is being fulfilled;
receiving an image of the item;
in response to the received message, identifying a set of one or more potential problems associated with the item;
generating a plurality of prompts for input into a large language model (LLM), the plurality of prompts including the image of the item and one or more questions, each of the one or more questions corresponding to a respective potential problem of the set of one or more potential problems;
requesting the LLM to generate, based on the plurality of prompts input into the LLM, a feedback response for each potential problem of the set of one or more potential problems;
generating an aggregated output by aggregating the feedback response for each potential problem of the set of one or more potential problems;
generating, based at least in part on the aggregated output, a second message that identifies one or more relevant problems associated with the item; and
causing the device of the picker to display the second message in a user interface.

13. The computer program product of claim 12, wherein the instructions further cause the processor to perform steps comprising:
identifying the set of one or more potential problems by selecting, from predetermined sets of potential problems associated with different categories of items, and based on one or more preferences of a user of the online system, the set of one or more potential problems associated with the item.

14. The computer program product of claim 12, wherein the instructions further cause the processor to perform steps comprising:
generating the plurality of prompts for input into the LLM by including in the plurality of prompts a set of relevance preferences, the set of relevance preferences comprising one or more preferences of a user of the online system, one or more item preferences, and one or more preferences for product categories.

15. The computer program product of claim 14, wherein the instructions further cause the processor to perform steps comprising:
generating the plurality of prompts by further including in the plurality of prompts at least one of: information about one or more prior orders placed by the user, information about one or more prior refunds associated with the item, information about one or more prior orders that include the item, information about one or more past item replacements, or information about past performance of the picker.

16. The computer program product of claim 14, wherein the instructions further cause the processor to perform steps comprising:
requesting the LLM to generate, based on whether the item in the image satisfies a respective criterion related to each relevance preference in the set of relevance preferences, the feedback response for each relevance preference in the set of relevance preferences.

17. The computer program product of claim 12, wherein the instructions further cause the processor to perform steps comprising:
receiving, from the device of the picker, a third message indicating that a second item from the order is being fulfilled;
receiving an image of the second item;
in response to the received third message, identifying a second set of one or more potential problems associated with the second item;
accessing a computer model of the online system trained to determine, for each of the second set of one or more potential problems, and based on the image of the second item, a likelihood of the second item having each of the second set of one or more potential problems;
applying the trained computer model to the image of the second item, wherein the applying causes the trained computer model to output a likelihood that the second item has each of one or more problems;
generating a second aggregated output by aggregating one or more likelihoods that the second item has the one or more problems;
generating, based at least in part on the second aggregated output, a third message that identifies the one or more problems associated with the second item; and
causing the device of the picker to display the third message in the user interface.

18. The computer program product of claim 12, wherein the instructions further cause the processor to perform steps comprising:
causing a device of a user of the online system to display a user interface with a third message informing the user about the one or more relevant problems associated with the item and a reason for a refund associated with the item.

19. The computer program product of claim 18, wherein the instructions further cause the processor to perform steps comprising:
receiving, from the device of the user, feedback about the third message;
classifying the received feedback into a corresponding relevance preference of a set of relevance preferences;
updating the set of relevance preferences by updating the corresponding relevance preference with the received feedback; and
updating, based on the updated set of relevance preferences, the plurality of prompts for input into the LLM.

20. A computer system comprising:
a processor; and
a non-transitory computer-readable storage medium having instructions that, when executed by the processor, cause the computer system to perform steps comprising:

receiving, from a device of a picker associated with an online system, a message indicating that an item from an order is being fulfilled;

receiving an image of the item;

in response to the received message, identifying a set of one or more potential problems associated with the item;

generating a plurality of prompts for input into a large language model (LLM), the plurality of prompts including the image of the item and one or more questions, each of the one or more questions corresponding to a respective potential problem of the set of one or more potential problems;

requesting the LLM to generate, based on the plurality of prompts input into the LLM, a feedback response for each potential problem of the set of one or more potential problems;

generating an aggregated output by aggregating the feedback response for each potential problem of the set of one or more potential problems;

generating, based at least in part on the aggregated output, a second message that identifies one or more relevant problems associated with the item; and causing the device of the picker to display the second message in a user interface.

* * * * *